Figure 1:
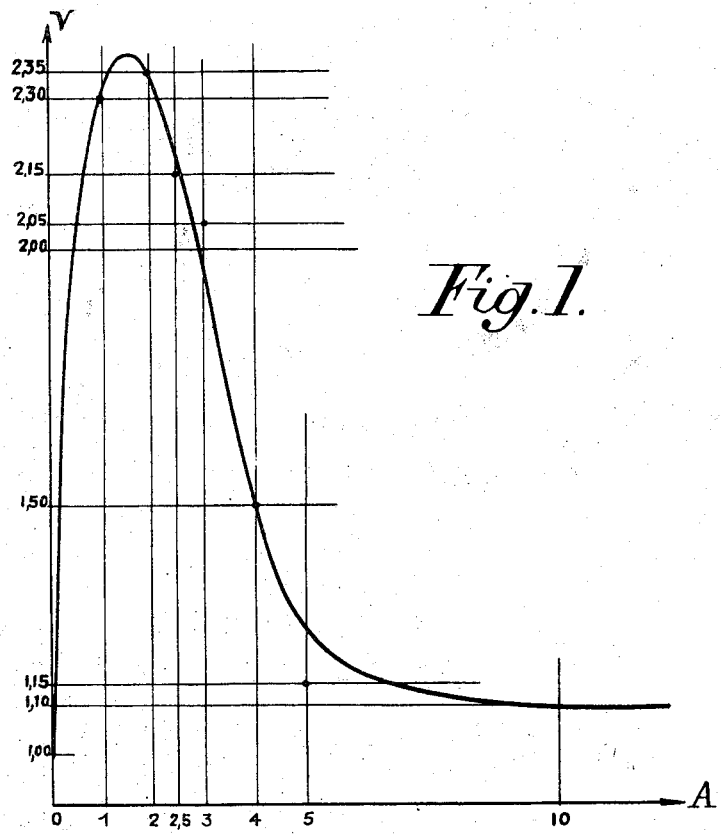

Sept. 28, 1965  M. BRUMA  3,208,846
SPARK MACHINING ELECTRODE
Filed Feb. 2, 1961

INVENTOR
MARC BRUMA
BY Bailey, Stephens &
Huettig
ATTORNEYS.

3,208,846
SPARK MACHINING ELECTRODE
Marc Bruma, Sceaux, France, assignor to Centre National de la Recherche Scientifique, Paris, France, a Government Administration of France
Filed Feb. 2, 1961, Ser. No. 86,787
Claims priority, application France, Feb. 9, 1960, 817,924
3 Claims. (Cl. 75—153)

The present invention relates to electrodes used as tools for machining metal pieces by intermittent electrical discharges, this operation making use of the electro-erosion phenomenon to machine pieces of an electricity conducting metal or alloy, whatever be the hardness of said pieces, by means of intermittent electrical discharges produced between these pieces and the tool electrodes made of electricity conducting metals or alloys the hardness of which may be substantially lower than that of said pieces.

The chief object of the present invention is to provide an electrode such that the speed of machining obtained therewith is increased.

The invention consists mainly in making the tool electrode in a mixture of on the one hand a conductor substance which can easily be machined, the proportion of this substance in the mixture being at least equal to 90% by weight and preferably higher than 95%, such a substance being constituted in particular by copper or a copper alloy and on the other hand a non metallic substance incorporated in said first mentioned substance in the form of a fine dispersion, said second mentioned substance being preferably chosen among the group consisting of hydrides, boron and borides, carbides, nitrides, oxides, silicon and silicides, and sulfides, The invention will be hereinafter described in detailed fashion with reference to the appended drawings which show curves representing some characteristics of electrodes made according to the invention.

It should first be reminded that it had already been proposed to make tool electrodes of the kind above referred to, with mixtures of conductor substances and non-metallic substances having a high melting point. The presence of these second mentioned substances was intended to reduce the wear and tear of the electrodes and their proportion in the mixture was always higher than 15% and generally higher than 35%.

Now it has been found, according to the present invention, that if the proportion of the additional substance was reduced to a value lower than 10%, and preferably lower than 5%, it was possible to obtain not only a reduction of wear of the tool but also, and chiefly, a very high increase of the rate of machining, said rate being in many cases more than twice the rate obtained with an electrode without such an addition or comprising an addition in a proportion higher than 15% by weight.

This remarkable effect is quite unexpected and it is very difficult to know the cause thereof.

It should further be noted that due to the relatively low value of said proportion the possibility of machining the electrode is still very good. The electrode according to the invention is not friable and it is possible to machine it so as to give it sharp ridges with possibly angular points close to one another, which would not be possible in the case of an electrode containing a higher amount of refractory additional substance.

Figure 2:
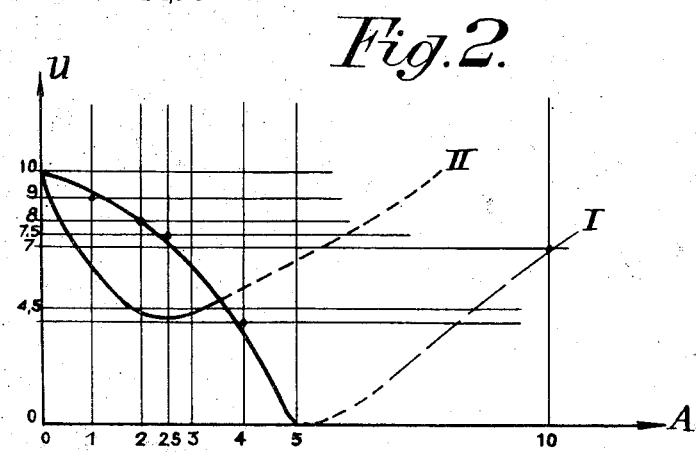

FIGS. 1 and 2 respectively are curves showing the variations of the two above-mentioned characteristics that is to say the machining rate V and the wear U of the tool electrode, these characteristics being plotted in ordinates, whereas the percentage by weight A of the additional substance is plotted in abscissas.

The numerical values indicated on these curves by way of illustration and referring to curve 1 of FIG. 2 correspond to an electrode made of copper with an addition of boron carbide for machining a piece of hard steel (containing 0.9% of carbon).

The rate of machining V, that is to say the amount of matter removed per unit of time from the piece to be machined, was numbered with reference to the rate of machining that would be obtained, other things being equal, with an electrode made of electrolytic copper, this last-mentioned rate being supposed to be equal to 100.

The wear U of the tool-electrode represents the ratio of the volume of matter worn off from this electrode to the volume of matter removed at the same time from the machined piece, this ratio being equal to about 10% for an electrode made of electrolytic copper, this in the same conditions of operation.

These two figures show the following features:

(a) for an addition of boron carbide ranging from 1 to 2%, the rate of machining V is multiplied by a high coefficient ranging from 2.30 to 2.35, but the wear U is only reduced by a value ranging from 10 to 20%, (b) for an addition of boron carbide of 3%, the rate U is still close to twice that corresponding to a copper electrode and the wear is about one half of that corresponding to such an electrode, (c) for an addition of boron carbide of 5%, the rate V is but little increased (about 15%) whereas the wear is practically zero.

It should be noted that the grain size of the boron carbide that is used is a significant factor and that the results above stated have been obtained for an average grain size ranging from 5 to 10 microns.

Experience teaches that for each of the above-mentioned additional substances, the following results are obtained:

For the variations of the rate of machining V, a curve of the type of that shown on FIG. 1, and For the variations of the wear U, a curve of the type of that designated by I on FIG. 2 for carbides and silicides and a curve of the type of that designated by II on FIG. 2 for hydrides, borides, nitrides, oxides and sulfides.

Numerical examples will now be given concerning the incorporation of substances of the above-mentioned types in a sintered copper electrode, these results having been obtained for additions of micro-crystalline aggregates, the average dimension of the grains of which is below 150 microns:

For an addition A ranging from 1 to 2% (preferably close to 1.5%) of titanium hydride $TiH_2$, or ranging from 0.5 to 2% of one of the following hydrides; zirconium hydride $ZrH_2$, thorium hydride $ThH_2$ or $ThH_4$, cerium hydride $CeH_3$ and lanthanum hydride $LaH_3$, the rate V is multiplied by a value ranging from 2.5 to 2.8 and the wear is reduced by about 30 to 40%.

For an addition A ranging from 0.3 to 3% of boron, or from 1 to 4% of boron nitride BN or from 1 to 5% of titanium boride $TiB_2$, or from 1 to 6% of zirconium boride $ZrB_2$, or from 2 to 8% molybdenum boride $MoB_2$, cerium boride $CeB_4$ or thorium boride $ThB_4$, the rate of machining V is multipled by a ratio ranging from 2.2 to 2.5 and the wear is reduced by about 50% to 60%.

For an addition A ranging from 0.7 to 1.3% of molybdenum carbide $Mo_2C$, the rate V is multiplied by a value ranging from 2.3 to 2.5 and the wear U is reduced by about 60%: for an addition A ranging from 0.5 to 5% of one of the following carbides: titanium carbide TiC, zirconium carbide ZrC, vanadium carbide VC, tantalum carbide TaC, silicon carbide SiC, cerium carbide $CeC_2$, thorium carbide ThC, chromium carbide $Cr_3C_2$, and tungsten carbide WC, the rate of machining V is nearly multiplied by 2 and the wear U is reduced by about one half; the addition of boron carbide has been studied above in detailed fashion with reference to the drawings.

For an addition A ranging from 0.5 to 3% of one of the following nitrides: titanium nitride TiN, zirconium nitride ZrN and thorium nitride ThN, the improvements concerning the rate of machining V and the wear U are quite similar to those obtained with and addition of the corresponding hydrides; the interesting addition of boron nitride has been considered before when studying additions of boron compounds and the addition (which is also an interesting one) of silicon nitride will be studied hereinafter when considering additions of silicon compounds.

For an addition A of about 5% of zirconia, the rate of machining V is multiplied by 1.9 and the wear U by 0.75; for an addition A of about 6.5% of copper oxide CuO, the rate of machining V is multiplied by 1.5 and the wear U is reduced by one half; thorium oxide $ThO_2$ and titanium oxide $TiO_2$ seem less advantageous due to the fact that the amounts of these oxides that should be incorporated in the electrode to multiply the rate V by factors ranging from 1.8 to 1.9 would be at least equal to 10% of the weight of the electrode which reduces the possibility of machining this electrode due to the fact that it is made friable.

For an addition A ranging from 0.2 to 0.3% of silicon or from 1 to 5% of one of the following refractory compounds of silicon: silicon nitride $Si_3N_4$, molybdeum silicide $MoSi_2$, titanium silicide $TiSi_2$, zirconium silicide $ZrSi_2$, cerium silicide $CeSi_2$, and thorium silicide $ThSi_2$, the rate of machining V is multiplied by a value ranging from 2.2 to 2.4 and the wear s reduced by 60 to 70%.

For an addition A (measured with reference to the weight of sulphur) ranging from 0.3 to 0.7% of molybdenum bisulphide and from 1 and 5% of one of the following sulphides: titanium sulphide $TiS_2$, zirconium sulphide $ZrS_2$, cerium sulphide $Ce_2S_3$, thorium sulphide $ThS_2$, silicon sulphide $SiS_2$, silver sulphide AgS, cadmium sulphide CdS and zinc sulphide ZnS, the rate of machining V is multiplied by a value ranging from 2.4 to 2.6 and the wear U is reduced by 50 to 60%.

Of course, the amount of the additional substance in the mixture must be higher than that corresponding to a mere trace or impurity; by way of example, it should be higher than 0.1% by weight of the total mixture.

It should be noted that, among the additional substances above referred to, there is a great number of compounds obtained by combining one of the following metalloids: hydrogen, boron, carbon, nitrogen, oxygen, silicon and sulphur with one of the metals of the group consisting of titanium, zirconium, hafnium, vanadium, niobnium, tantalum, chromium, molybdenum, tungsten, rare earth metals of the series of lanthanum and metals of the series of thorium.

According to the present invention, an electrode may comprise several of the bodies above-mentioned, for instance in order to obtain simultaneously a great increase of the rate of machining and a low wear.

The electricity conducting substance which constitutes most of the mass of the electrode is generally copper or a copper alloy containing for instance in addition to copper a small percentage of silver, cadmium, chromium or the like.

The additional substance is incorporated in the main substance in any suitable manner. For instance, the materials constituting the electrode are in the form of powders, these powders are intimately mixed together and the powder mixture thus obtained is given the desired shape for instance by compression (possibly a hydrostatic compression) either in the cold or in the hot state in a mould of the desired shape made of a metal or possibly of rubber, thermoplastic resin or any other suitable material or again by rolling, extrusion and so on. Then the whole is heated to give it its final shape, possibly under pressure, at a sintering temperature lower than the melting point of the mixture, possibly in a controlled atmosphere. Finally, the body thus obtained is given a finishing machining and may be again compressed.

The initial compression and the final recompression may be applied in any suitable manner and in some cases under the form of sudden and intensive impulses obtained by an explosion, said explosion being possibly produced by chemical explosives or by an electric discharge in a medium capable of transmitting a shock wave.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A spark machining electrode formed of composite material consisting essentially of a main substance of the group consisting of copper and of conducting and easily machinable copper alloys and a non-metallic additional substance of the group consisting of titanium hydride, zirconium hydride, thorium hydride, cerium hydride, lanthanum hydride, boron, titanium boride, zirconium boride, thorium boride, cerium boride, molybdenum boride, titanium carbide, zirconium carbide, thorium carbide, cerium carbide, molybdenum carbide, vanadium carbide, tantalum carbide, silicon carbide, chromium carbide, tungsten carbide, boron carbide, titanium nitride, zirconium nitride, thorium nitride, boron nitride, silicon nitride, zirconia, copper oxide, silicon, titanium silicide, zirconium silicide, thorium silicide, cerium silicide, molybdenum silicide, titanium sulphide, zirconium sulphide, thorium sulphide, cerium sulphide, molybdenum bisulphide, silicon sulphide, silver sulphide, cadmium sulphide and zinc sulphide, said additional substance being incorporated in said main substance in the form of a fine dispersion therein, the amount of said additional substance being comprised between 0.1 and 10 percent by weight of the total mixture and its average grain size being lower than 150 microns.

2. A spark machining electrode formed of composite material consisting essentially of a main substance of the group consisting of copper and of conducting and easily machinable copper alloys and zirconium hydride $ZrH_2$, said zirconium hydride being incorporated in said main substance in the form of a fine dispersion therein, the amount of said additional substance being comprised between 0.5 to 2 percent by weight of the total mixture and its average grain size being lower than 150 microns.

3. A spark machining electrode formed of composite material consisting essentially of a main substance of the group consisting of copper and of conducting and easily machinable copper alloys and titanium hydride $TiH_2$, said titanium hydride being incorporated in said main substance in the form of a fine dispersion therein, the amount of said additional substance being comprised between 0.5 to 2 percent by weight of the total mixture and its average grain size being lower than 150 microns.

(References on following page)

References Cited by the Examiner

UNITED STATES PATENTS

| | | | |
|---|---|---|---|
| 679,877 | 8/01 | Bremer | 313—357 |
| 1,759,686 | 5/30 | Carlson | 313—357 |
| 2,202,150 | 5/40 | Hensel et al. | 75—153 |
| 2,786,128 | 3/57 | Lines | 75—153 |
| 2,929,707 | 3/60 | Weeks et al. | 75—201 |
| 2,929,954 | 3/60 | Blatz | 313—357 |
| 3,045,331 | 7/62 | Ang et al. | 75—153 |

DAVID L. RECK, *Primary Examiner.*

ARTHUR GAUSS, *Examiner.*